United States Patent [19]

Feizollahi

[11] Patent Number: 4,844,840

[45] Date of Patent: Jul. 4, 1989

[54] METHOD AND STRUCTURE FOR HAZARDOUS WASTE CONTAINMENT

[75] Inventor: Faramarz Feizollahi, San Ramon, Calif.

[73] Assignee: Bechtel Group, Inc., San Francisco, Calif.

[21] Appl. No.: 85,913

[22] Filed: Aug. 14, 1987

[51] Int. Cl.⁴ .......................... G21F 9/12; G21F 9/16; G21F 9/24; B09B 1/00

[52] U.S. Cl. .................................... 252/633; 252/628; 250/507.1; 376/272; 405/128; 405/129; 405/270

[58] Field of Search ................ 252/633, 628; 376/261, 376/250, 272, 253; 250/506.1, 507.1; 405/128, 129, 260, 266, 267, 268, 270, 303

[56] References Cited

U.S. PATENT DOCUMENTS

| | | | |
|---|---|---|---|
| 3,046,403 | 7/1962 | Montgomery | 252/633 |
| 3,935,467 | 1/1976 | Gablin | 250/507.1 |
| 4,177,386 | 12/1979 | Wachter et al. | 250/507.1 |
| 4,229,316 | 10/1980 | Baatz et al. | 252/301.1 |
| 4,350,461 | 9/1982 | Valiga | 405/128 |
| 4,362,434 | 12/1982 | Valiga et al. | 405/128 |
| 4,375,930 | 3/1983 | Valiga | 405/128 |
| 4,415,459 | 11/1983 | Coffman et al. | 210/747 |
| 4,428,700 | 1/1984 | Lennemann | 405/128 |
| 4,453,857 | 6/1984 | Serra et al. | 405/128 |
| 4,464,081 | 8/1984 | Hillier et al. | 405/128 |
| 4,513,205 | 4/1985 | Splinter | 250/507.1 |
| 4,543,013 | 9/1985 | Wagner et al. | 405/128 |
| 4,588,088 | 5/1986 | Allen | 206/525 |
| 4,624,604 | 11/1986 | Wagner et al. | 405/128 |
| 4,632,602 | 12/1986 | Hovnanian | 405/128 |

FOREIGN PATENT DOCUMENTS

| | | | |
|---|---|---|---|
| 3303067 | 8/1984 | Fed. Rep. of Germany | 405/128 |

*Primary Examiner*—Howard J. Locker
*Attorney, Agent, or Firm*—Townsend & Townsend

[57] ABSTRACT

Primary waste containers are placed in prefabricated canisters and sealed with a curable fluid sealant, such as grout. The canisters are then stacked in an interlocking manner to form a stable integrated structure. The containers are not, however, permanently attached to one another, so that individual containers are able to shift relative to one another in response to earth movements. In this way, the integrity of the individual container is maintained and the sealed wastes protected even when the integrated structure as a whole experiences significant stresses from earth movement.

20 Claims, 3 Drawing Sheets

METHOD AND STRUCTURE FOR HAZARDOUS WASTE CONTAINMENT

BACKGROUND OF THE INVENTION

1. Field of the Invention

The present invention relates generally to the field of hazardous waste containment and disposal. In particular, the invention relates to a method and structure suitable for both short and long term storage and permanent disposal of hazardous wastes, particularly nuclear wastes, where the containment structure resists failure from earth movement and allows rapid location and isolation of any leaks which should occur.

Hazardous wastes include a variety of toxic and radioactive substances which would cause harm if released directly into the environment. The various types of hazardous wastes are generally defined by the United States Environmental Protection Agency (EPA) and the Nuclear Regulatory Commission (NRC). With respect to hazardous wastes of a radioactive nature, the NRC presently identifies the following classes of low level wastes with respect to containment and disposal. Class A: Wastes for which there are no stability requirements but which must be disposed of in a segregated manner from other wastes. These wastes, termed class "A", or "segregated wastes, are defined in terms of maximum allowable concentrations of certain isotopes and certain minimum requirements on waste form and packaging that are necessary for safe handling. Class B: Wastes which need to be placed in a stable form and disposed of in a segregated manner from unstable waste forms. These wastes, termed class "B", or "stable" wastes, are also defined in terms of allowable concentrations of isotopes and requirements for a stable waste form as well as minimum handling requirements. Class C: Wastes which need to be placed in a stable form, disposed of in a segregated manner from nonstable waste forms, and disposed of in such a manner that a barrier is provided against potential inadvertent intrusion after institutional controls have lapsed. These wastes are termed class "C", or "intruder protected" wastes, and are also defined in terms of allowable concentrations of isotopes and requirements for disposal by deeper burial or some other barrier.

A fourth class of wastes (mixed wastes) which is not included in the NRC's current listing comprises radioactive wastes contaminated by chemical components classified as hazardous wastes by the EPA.

In general, hazardous wastes cannot be completely eliminated, but rather must be contained in a manner which prevents their release into the environment for very long periods of time, which in practical terms would be considered permanent. A variety of approaches have been proposed for such long term containment, including burial of primary containers holding the waste, disposal of such containers at sea, incorporation of the waste and/or containers of the waste in a solid matrix, such as cement, and the like.

In general, most of the proposed approaches suffer from certain drawbacks. The disposal of wastes in primary containers, such as barrels or drums, either by burial or at sea, depends on the integrity of the container. Encapsulation of the containers in concrete, in contrast, would appear to provide long term stability and containment, but in fact can be subject to failure from a variety of causes, particularly earth movement resulting from earthquakes, earth subsidence and the like. Such earth movements frequently can fracture even the most solid containment matrixes over a long period of time.

An additional problem relates to the detection of leaks in a long term containmnent facility. Although a number of leak detection systems have been proposed, generally they do not allow for precise location of the leak. As many of these containment facilities are quite large, knowledge that a leak has occurred without knowing the precise origin of the leak can be problematic. Moreover, even after the leaks are detected, most storage facilities do not provide for any convenient manner for the leak to be cleaned and facility restored.

For the above reasons, it would be desirable to provide a method and structure for the secure containment of radioactive and other hazardous wastes for very long time periods. In addition, it would be desirable to provide methods and systems for leak detection in such containment structures which would allow the immediate location and isolation of leaks which might occur in the structure, and further allow for correction of the leak and restoration of the structure.

2. Description of the Background Art

The use of nested containers for the storage of nuclear and hazardous wastes has been proposed. See, e.g., U.S. Pat. No. 4,229,316 which describes the use of an inner metal container for storing liquid wastes, where the container is housed in an outer concrete receptacle, and excess space within the receptacle is filled with a radiation-absorptive substance; U.S. Pat. No. 4,588,088 which describes an inner container, typically a metal drum, housed within an exterior container 20, where the interstitial space between the two containers is filled with a sealant material; U.S. Pat. No. 4,453,857, which discloses the sealing of a plurality of containers, typically steel drums, in a solid concrete block; and U.S. Pat. No. 4,513,205, which discloses the use of nested concrete vaults to hold a plurality of inner containers, typically metal barrels. Monitoring of possible leakage of nuclear and hazardous wastes from underground storage systems is known. See, e.g., U.S. Pat. No. 4,513,205, where an inner vault is placed within an observation vault to allow for monitoring of leakage; U.S. Pat. No. 4,464,081, where an underlying pipe and manifold system is placed beneath an underground storage facility to collect seepage and monitor for hazardous wastes; and U.S. Pat. Nos. 4,624,604 and 4,543,031, both of which disclose a leakage detection system located beneath a landfill site. U.S. Pat. No. 4,362,434 discloses a lined basin for the collection of hazardous wastes in bulk. Monitoring of leakage can be done through a sump system. U.S. Pat. No. 4,375,930 also discloses a hazardous waste site having a sump which allows observation of leakage and leachate. U.S. Pat. No. 4,428,700, describes a particular filler which can be used for sealing hazardous waste, either in containers or otherwise, in underground storage locations.

SUMMARY OF THE INVENTION

The present invention provides a method and structure for the permanent or temporary containment of hazardous and toxic wastes, particularly nuclear wastes. The method allows for the collection of such wastes over an extended period of time, typically years, in conventional containers, such as metal drums, liners and dry active waste boxes. The containers are collected and sealed within larger canisters, typically concrete boxes. The remaining interstitial space within the canisters will typically be sealed with a curable fluid sealant, such as grout, to provide both mechanical stability and radiation shielding. The individual canisters are shaped in a particular geometry which allows them to be stacked in an interlocking manner to form an integrated monolithic structure in which canisters are held firmly in place by gravity, but are able to shift relative to one another in response to earth movements, such as earthquakes, ground shifting, settling, sliding, and the like.

The use of such interlocking canisters which are held in place by gravity has particular advantages. First, the relative shifting of canisters will not generally result in fracturing or other damage to the individual canisters. Thus, the integrity of the canister seal is maintained even when the disposal site is subject to earthquakes, subsidence, and other earth movement. Equally important, should a leak occur in one of the canisters, the integrated structure may be disassembled to allow for removal and repair of the defective canister without disturbing the seal of the other canisters. Finally, the assembly of the integrated structure is greatly simplified as there is no need to tie or otherwise connect the individual canisters together.

The integrated disposal structure of the present invention is suitable for above ground, partially buried, and underground disposal sites. In all cases, a barrier layer will be prepared over the site to seal the ground surface to inhibit penetration of water which passes through the structure (to prevent ground water contamination should a leak occur in one of the canisters). Usually, a system will be provided for collecting the water which has passed through the structure, which system may be adapted to monitoring for the presence of hazardous wastes in the water from the structure. In the preferred embodiment, the collection system is zoned to provide for segregated collection of water from a plurality of sections beneath the integrated structure. In this way, the area where a leaking canister is located and from which the hazardous waste is originating may be quickly identified. The integrated structure can then be disassembled in the area of the leak, leaving the remainder of the structure intact. After removal of the defective canister, the integrated structure can then be restored.

In the case of particularly hazardous wastes, e.g., the Class C wastes and mixed wastes defined above, the present invention allows for verification of the integrity of the integrated structure prior to and after the final closure of the structure with a permanent earthen cover. Prior to the final closure, the structure may be allowed to remain without the earthen cover for a certain period of time so that the leak tightness of the structure is verified. Before the final earthen cover is placed, it is desirable to expose the structure for an interim period to conditions that are the same or more severe than the conditions the structure will be exposed to while buried under the earthen cover during the long-term isolation period. In this interim period, the structure will be exposed to rainwater, snow, freeze and thaw cycles, and other harsh environmental conditions which will verify the performance expected from the structure. These conditions will test the integrity, leak tightness, stability, strength and other related properties. During this interim period, the existence of a failure in the integrity of the structure, which usually means the existence of a faulty canister, can be easily detected by periodically collecting water from the integrated structure and sampling for contamination. In the event that the existence of a failed canister is indicated by these sampling operations, such canister can be easily remedied by removal from the structure followed by repair and replacement in its original position in the integrated structure. If no failure in the integrity of the structure is detected after a predetermined number of years, the integrated structure can be closed in a permanent manner, typically by placement of an earthen cover over the integrated structure. The present invention is also capable of monitoring the integrity of the structure for a number of years after the final closure with the earthen cover.

The method and structure of the present invention has a number of additional advantages. A wide variety of waste streams may be accepted for short-term, long-term or permanent isolation in surface, partially buried, and underground storage. The structure may be adapted to a wide variety of natural features at the disposal site, and employs common construction materials, such as reinforced concrete, which are readily available and known for their long-term reliability and performance. The initial placement of waste containers into the protective canisters is usually handled remotely in an enclosed area for the protection of the workers. All remaining operations, however, can be handled by workers without additional protection as the canisters provide sufficient shielding for worker safety. The monitoring and recoverability of the individual canisters may be performed over extended periods, exceeding one hundred years, and a substantially permanent sealing minimizes contact between the waste and water at all times.

DESCRIPTION OF THE SPECIFIC EMBODIMENTS

According to the method of the present invention, hazardous and toxic wastes, typically nuclear wastes, are stored temporarily or permanently at a waste disposal site. The waste disposal site may be above ground, or may be excavated to provide for partially buried or underground storage. In any case, the disposal site will initially be graded to a relatively flat profile. The size of the disposal site may vary widely, with areas ranging from about 5 to 150 acres normally being deployed for a single integrated disposal structure.

After the disposal site is selected and the earth graded, a relatively shallow collection basin is formed for collecting leachate which is formed as natural rain waters percolate downward through the integrated disposal structure. The basin includes an underlayer or bed which is substantially impermeable to aqueous penetration and a peripheral apron so that the leachate may be collected for disposal and monitoring. Typically, the basin will be divided into zones so that leachate collected in different areas or zones may be sent to different disposal and monitoring locations. Usually, the zones will be isolated from one another and be excavated to include low points where the leachate will collect. Collection manifolds are located at the low points and feed individual collection sumps which have monitoring equipment. By separately monitoring the various collection zones, the location of a leak within a single zone can be quickly determined shortly after it is initially detected.

Figure 1:
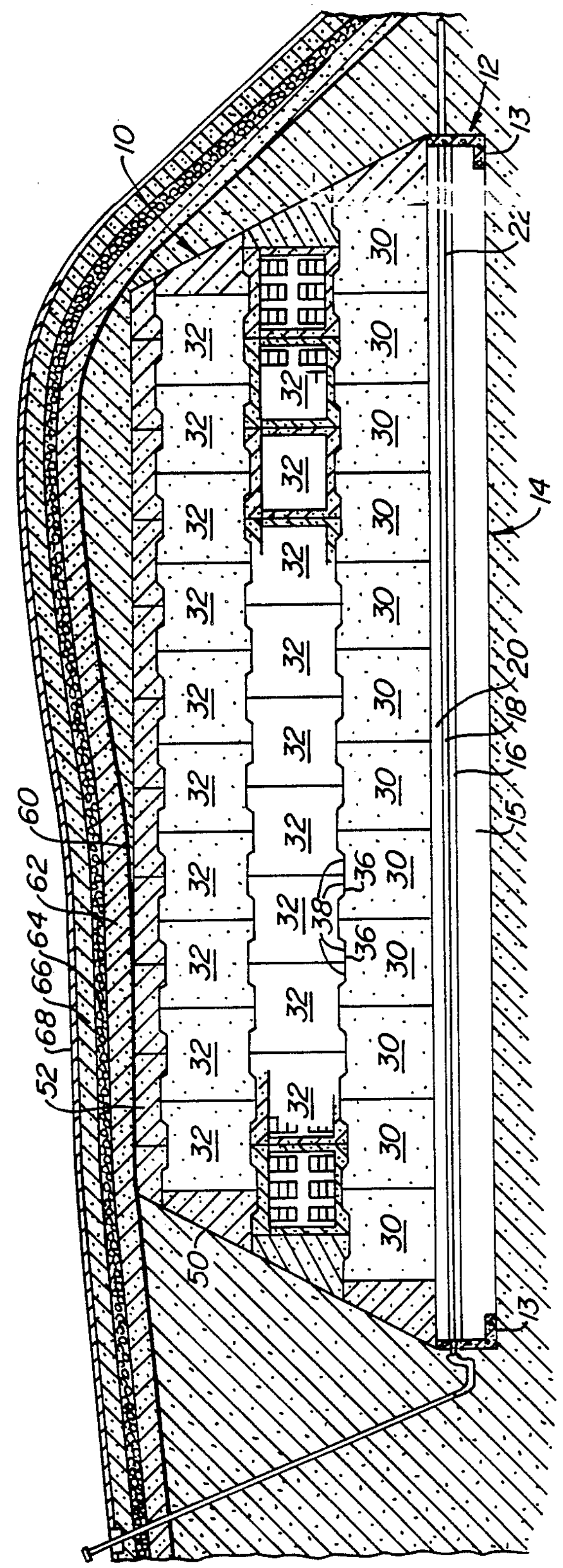
FIG. 1 is a schematic elevational view illustrating an integrated disposal structure which has been built up by the method of the present invention, resulting in a completely sealed waste disposal site.

Referring now to FIG. 1, an integrated disposal structure 10 is illustrated in its final, sealed configuration. The integrated structure 10 is formed over a basin 12, which includes a peripheral apron 13 and an impermeable bed 14. The impermeable bed 14 acts to collect the leachate within the basin 12 and prevent penetration of the leachate into the ground water. The bed 14 will usually include multiple layer, typically being formed from a compacted clay layer having a thickness in the range from about one to six feet, more usually being about three feet; a coarse layer of sand 16, typically having a thickness from about two to 12 inches, more typically being about six inches; a layer of soil, typically having a thickness in the range from about one to 12 inches, more typically being about four inches; and a gravel drainage layer 20, typically having a thickness of about six inches to two feet, more typically being about one foot. The layers just described interact to collect the leachate within the gravel drainage layer 20 of the basin 12. The leachate flows laterally through the gravel drainage layer 20, and is collected in a plurality of manifolds 22 (only one of which is illustrated in FIG. 1) which may be directed to separate collection and monitoring stations (not illustrated). The basin 12, of course, is properly excavated and sloped so that one predefined area or zone within the basin drain to particular collection and monitoring stations.

After formation of the basin 12, lower level waste canisters 30 (FIG. 3) may be placed over the gravelled drainage layer 20. The gravel conforms to the lower surface of the canisters 30, providing stable support. The canisters 30 are held in place solely by gravity, and adjacent canisters 30 are not interconnected other than by the overlaying layer of upper canister 32, as will now be described.

Figure 2:
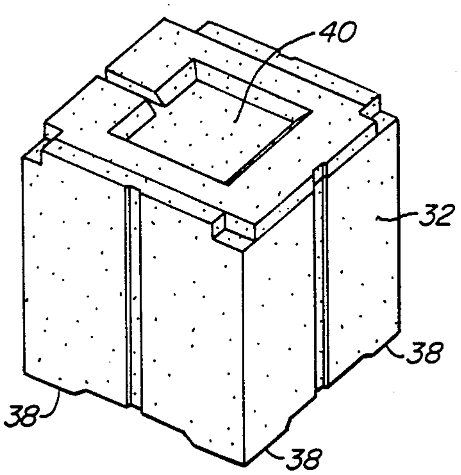
FIG. 2 illustrates an upper level canister which is utilized in constructing the integrated structure of FIG. 1.

Upper layer canisters 32 are placed over the lower level canisters 30 to form an interlocking stack. As best observed in FIGS. 2, 3, and 4, each lower level canister 30 includes a rectangular receptacle 36 on its upper face. Each upper level canister 32, in turn, includes four lower footings 38 which are disposed at each of the four corners of the lower face of the container 32. It will be appreciated that the canisters 32 may be stacked over the canisters 30 in an interlocking manner by placing the footings 38 in the receptacle 36 so that footings from four adjacent canisters 32 are received in each individual receptacle 36. Such an interlocking stack provides a high degree of stability while allowing for relative movement of the individual canisters 30 and 32 in response to earth movements, such as earthquakes, ground sliding, slipping, subsidence, and the like.

Figure 4:
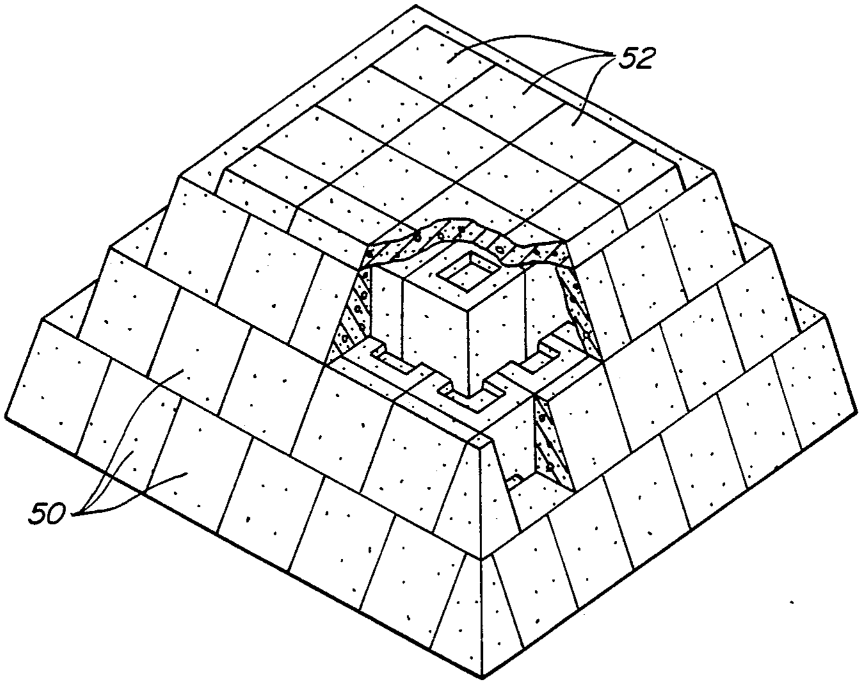
FIG. 4 is a partially completed monolithic structure having top and end caps placed over the stacked, interlocked canister, with portions removed.

Upper level canisters 32 include a receptacle 40 on their upper face which is similar in all respects to the receptacle 36 on the lower level canisters 30. In this way, additional layers of upper level canisters 32 may continue to be stacked on top of one another to provide a desired total number of layers in the final integrated structure 10. As illustrated in Figs. 1 and 4, a total of three canister layers are illustrated. In a typical disposal facility, the canisters may be stacked in from about 2 to 10 layers, more usually in from about 3 to 5 layers.

In the usual operation, the second, third, and subsequent layers are started prior to the completion of the underlying layer. Thus, after a sufficient number of lower level canisters 30 have been placed, to form a suitable surface, placement of the next layer of upper level canisters 32 will be commenced. Similarly, after a sufficient number of canisters 32 in the second layer have been positioned, placement of the canisters of the third layer 32 will begin. In this way, the integrated structure 10 will grow laterally, as well as in layers. This approach is much more efficient in that it allows the stacking operations to be concentrated at a particular area until that area is complete.

After completion of a given area of the integrated structure 10, side caps 50 and top caps 52 (FIGS. 1 and 4) may be placed to provide for a penetration barrier over the integrated structure. Once the entire integrated structure 10 is completed, it may be sealed under soil to allow for landscaping of the disposal facility. Typically, the structure 10 will be backfilled to provide for a relatively level layer on top. A synthetic liner 60 will then be placed over the backfill, followed by a layer of compacted clay 62, usually being at least several inches thick. A gravel layer 64 is then placed over the compacted clay 62, and an uncompacted fill layer 66 and an earthen layer 68 placed over the gravel layer 64.

Figure 3:
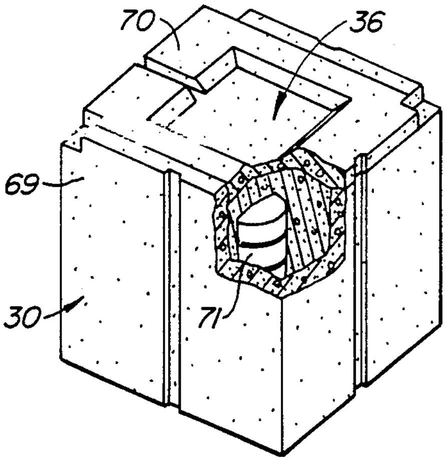
FIG. 3 is a bottom level canister which is utilized in constructing the integrated structure of FIG. 1.
Figure 5:
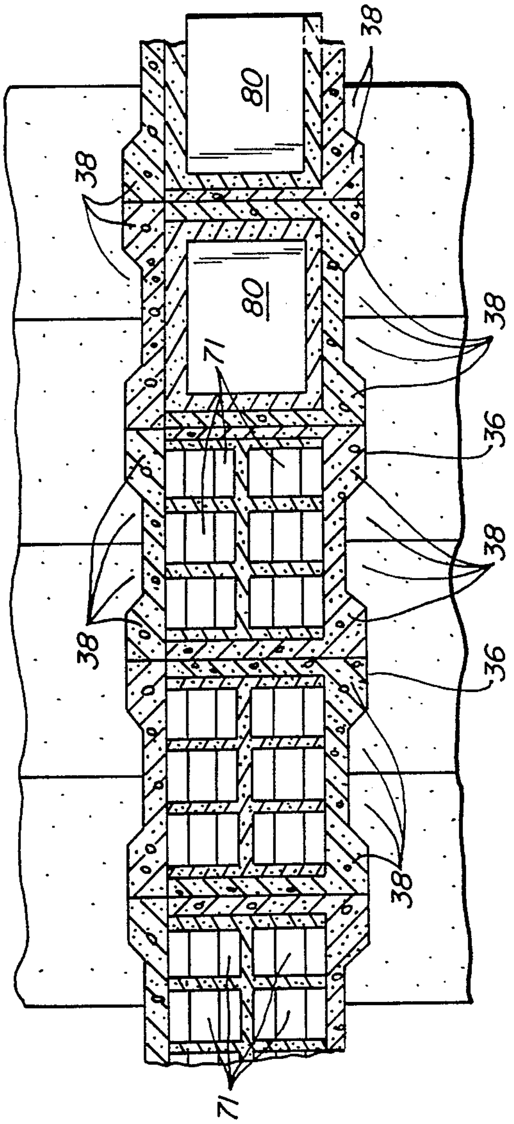
FIG. 5 is a schematic elevational view of the plurality of stacked, interlocked canisters, with portions broken away to illustrate the primary waste containers contained inside the canisters.

The waste disposal canisters 30 and 32 are typically reinforced concrete receptacles 69 having a concrete cover 70, as best illustrated in FIGS. 3 and 5. Primary waste containers, such as barrels 71 and waste containment boxes 80, as illustrated in FIG. 5, are placed within the receptacle 69, and the interstitial space within the receptacle filled with a curable fluid sealant, typically grout. The cover 70 is then placed over the receptacle 69 to form the hardened and shielded canister 30 or 32 which is stacked in the structure 10 of the present invention.

The handling of the primary waste disposal containers 71 and 80 and filling of the canisters 30 and 32 is handled in a shielded area, with all operations performed remotely, when necessary, in order to protect the personnel. Once the canisters 30 and 32 have been closed and sealed, however, they may be handled without additional shielding since they provide sufficient protection for personnel.

Although the foregoing invention has been described in some detail by way of illustration and example for purposes of clarity of understanding, it will be obvious that certain changes and modifications may be practiced within the scope of the appended claims. At this point in certain claims which are written out and accompany of a tape what follows is an abstract.

What is claimed is:

1. A method for containment of hazardous waste materials, said method comprising:

collecting a plurality of primary containers which hold the wastes;

sealing one or more of the primary containers within a canister; and stacking a plurality of the canisters in an interlocking manner over a substantially impermeable bed in an excavated disposal site, whereby said canisters form an integrated structure in which the individual canisters are generally held in place by gravity but able to shift relative positions in response to earth movement without fracturing of said canisters, wherein the canisters are arranged in at least two layers with each canister in an overlying layer interlocking with canisters in the underlying layer.

2. A method as in claim 1, further comprising collecting drainage from different areas of the bed beneath the integrated structure, and analyzing the discharge from each of the areas for the leakage of hazardous waste.

3. A method as in claim 1, further comprising covering the integrated structure with a substantially impenetrable barrier to inhibit accidental penetration.

4. A method as in claim 1, wherein the primary containers are sealed in the canisters with a fluid sealant which hardens after curing.

5. A method as in claim 4, wherein the fluid sealant is grout.

6. A method as in claim 2, wherein the canisters in a particular area are unstacked and examined for leakage in response to the detection of hazardous waste in the drainage from that area.

7. A containment structure for hazardous waste materials, said structure being located on an excavated site and comprising:

a barrier layer over the excavation site, said barrier being substantially impermeable to aqueous penetration;

a plurality of canisters stacked over the barrier layer to form an integrated structure, wherein each of said canisters houses one or more primary waste containers and includes means for externally interlocking with surrounding canisters so that individual canisters may be stacked and held in place by gravity while remaining able to shift relative positions in response to earth movement and wherein said canisters are arranged in at least two layers with each canister in an overlying layer interlocking with canisters in the underlying layer; and means for sealing over the top and sides of the integrated structure to inhibit accidental penetration.

8. A containment structure as in claim 7, wherein the barrier layer includes compacted clay.

9. A containment structure as in claim 7, wherein the canisters are composed of concrete.

10. A containment structure as in claim 9, wherein the primary containers are sealed within the canisters by a grout sealant which fills substantially all the interstices between the containers.

11. A containment structure as in claim 7, wherein each canister in the immediately overlying layer interlocks with four canisters in the immediately underlying layer.

12. A containment structure as in claim 7, wherein the means for sealing over the top and sides comprises panels which will interlock with the integrated structure of canisters.

13. A containment structure for hazardous waste materials, said structure being located on an excavated site and comprising:

a barrier layer over the bottom of the excavation site, said barrier layer being substantially impermeable to aqueous penetration;

a plurality of canisters stacked over the barrier layer to form an integrated structure, wherein each of said canisters houses one or more primary waste containers sealing the hazardous wastes therein, said primary waste containers being sealed within the canisters by a fluid sealant which hardens after curing, said individual canisters each including means for externally interlocking with surrounding canisters so that said individual canisters may be stacked and held in place by gravity while remaining able to shift relative positions in response to earth movements;

means intermediate the stacked containers and the barrier layer for collecting drainage separately from a multiplicity of preselected isolated zones beneath the integrated structure; and means for detecting leakage of the hazardous material into the drainage from each of the preselected zones.

14. A containment structure as in claim 13, wherein the barrier layer includes compacted clay.

15. A containment structure as in claim 13, wherein the canisters are composed of concrete.

16. A containment structure as in claim 13, wherein the means for collecting drainage includes collection conduits placed at the low point of said isolated zones beneath the integrated structure.

17. A containment structure as in claim 17 wherein the means for detecting leakage includes separate collection sumps associated with each collection conduit.

18. A containment structure as in claim 19, wherein the canisters are arranged in layers, with each canister locking into four canisters in both the immediately overlying layer and the immediately underlying layer.

19. A containment structure as in claim 13, further comprising means for sealing over the top and sides of the integrated structure to inhibit accidental penetration.

20. A containment structure as in claim 19, wherein the means for sealing over the top and sides comprises top and side panels which will interlock with the integrated structure of canisters.

* * * * *